United States Patent [19]

Zangenehpour

[11] Patent Number: 5,257,143

[45] Date of Patent: Oct. 26, 1993

[54] METHOD AND APPARATUS FOR POSITIONING HEAD OF DISK DRIVE USING ZONE-BIT-RECORDING

[75] Inventor: Saied Zangenehpour, Lincoln Township, Berrien County, Mich.

[73] Assignee: Zenith Data Systems Corporation, Buffalo Grove, Ill.

[21] Appl. No.: 641,264

[22] Filed: Jan. 15, 1991

[51] Int. Cl.⁵ .............................................. G11B 5/09
[52] U.S. Cl. ....................................... 360/48; 360/40; 360/51; 360/72.1
[58] Field of Search ...................... 360/72.1, 72.2, 40, 360/51, 78.04, 48

[56] References Cited

U.S. PATENT DOCUMENTS

| | | | |
|---|---|---|---|
| 4,016,603 | 4/1977 | Ottesen | 360/72.2 X |
| 4,200,928 | 4/1980 | Allan et al. | 395/425 |
| 4,647,991 | 3/1987 | Zangenehpour | 360/72.2 |
| 4,758,944 | 7/1988 | Bartley et al. | 395/425 |
| 4,999,720 | 3/1991 | Wilson et al. | 360/40 X |
| 5,050,013 | 9/1991 | Holsinger | 360/72.1 |

Primary Examiner—Joseph L. Dixon
Assistant Examiner—David L. Robertson
Attorney, Agent, or Firm—Flynn Thiel Boutell & Tanis

[57] ABSTRACT

A zone-bit-recording disk drive has a rotating platter with a surface which is divided into at least two zones each having a respective different number of angularly spaced sectors therein. A method and apparatus for positioning the head relative to the platter surface involve maintaining a count of the number of sectors which pass the head after the platter passes a predetermined angular orientation, ignoring the count during a time interval when the head moves out of a first of the zones toward a second of the zones which contains the specified sector and until the head has entered the second zone and the platter thereafter passes a predetermined angular orientation, and thereafter determining when the count corresponds to the specified sector to be accessed.

6 Claims, 4 Drawing Sheets

METHOD AND APPARATUS FOR POSITIONING HEAD OF DISK DRIVE USING ZONE-BIT-RECORDING

CROSS REFERENCE TO RELATED APPLICATIONS

This application is related to but in no way dependent on "Two Stage Cache Memory System and Method", Ser. No. 292,189, filed on Dec. 30, 1988; "Dynamic Pre-fetch for a Cache Memory", Ser. No. 345,915, filed on May 1, 1989; and "Method and Apparatus for Replacing Data in a Cache Memory", Ser. No. 292,579, filed on Dec. 30, 1988, all of common ownership and inventorship herewith.

FIELD OF THE INVENTION

The present invention relates to a method and apparatus for effecting position sensing to locate data on a computer disk drive and, more particularly, to a method and apparatus for effecting position sensing with zone-bit-recording disk drives.

BACKGROUND OF THE INVENTION

Information can be stored on and retrieved from sectors allocated on rotating magnetic or optical mass-storage devices such as the disks of a hard disk drive. The surface of given disk is typically divided into a number of concentric tracks, each track being divided into a series of arcuate sectors which store data. In order to read or write data to or from a sector on the disk, the head of the disk unit must first be properly positioned relative to the sector. This involves a three-stage process. First, the head is moved radially with respect to the disk until it is aligned with the track containing the requested sector, then the disk must rotate to a position in which the sector in question is about to move past the head, and then the data must be read or written. These three times are commonly referred to as the seek time, the latency time and the data transfer time.

In some conventional drives, a controller for two or more disk drives specifies the sector which is to be accessed on a particular drive. That drive then moves its head until the head is radially aligned with the track containing that sector, and then at the end of this seek time the controller is notified that the track has been located. Then, during the latency time, the head reads successive sectors from a starting point of the track, the controller examines them until it determines that the sector of interest has been found, and then it accepts the data from that sector. Statistically, therefore, the average latency time is approximately the interval required for the disk to rotate 180°. Obviously, having the controller dedicated to a single disk drive throughout its latency time is inefficient.

The present inventor previously developed a technique for reducing this inefficiency, in particular by providing a circuit which can monitor the angular position of the disk in each of several disk drives during the latency time of each, and which provides notification to the controller shortly before the sector of interest in each drive comes into alignment with its respective head, so that the controller is not dedicated to each disk drive throughout its latency time but instead dedicates itself to any given disk drive only for an interval which is approximately the time required for two sectors on that disk to move past the head. This arrangement is disclosed in the inventor's U.S. Pat. No. 4,647,991, which issued on Mar. 3, 1987. However, the arrangement disclosed in this prior patent is intended specifically for use with conventional disks of the type in which each track has the same number of sectors.

More specifically, due to the circular shape of the traditional disk, information is typically disproportionately distributed on each track, because the outer tracks are divided into same number of sectors as the inner tracks. One way to remedy this disproportionate distribution of information is the known technique of zone-bit-recording. In zone-bit-recording, several concentric zones are defined which each include one or more tracks, and each zone is proportionately divided into a different number of sectors, depending on the amount of space available in each zone. Through the use of zone-bit-recording, a substantially larger amount of information can be recorded on a given disk than is the case where the same number of sectors are provided in every track on the disk. However, conventional disk drives which use zone-bit-recording techniques still require that the associated controller remain dedicated to the particular drive during the latency time and examine data from every sector read by the head during the latency time.

It is therefore an object of the present invention to provide an arrangement for a zone-bit-recording drive which avoids the need to have the controller dedicated to the drive throughout the latency time of the drive.

It is a further object of the present invention to provide such an arrangement which is compatible with existing standard disk interfaces such as the Enhanced Small Disk Interface (ESDI).

It is a further object of the invention to provide such an arrangement which involves a minimal amount of additional hardware, and thus minimal expense and no significant decrease in reliability.

The objects and purposes of the invention, including those set forth above, are met according to one form of the present invention by a method of sensing the position of a head of a zone-bit-recording disk drive relative to a rotating platter thereof which has a surface divided into at least two zones each having a respective different number of angularly spaced sectors therein, by carrying out the steps of: maintaining a count of the number of sectors which pass the head after the head passes a predetermined angular orientation, ignoring the count during a time interval when the head moves out of a first of the zones toward a second of the zones which contains the specified sector and until the head has entered the second zone and the platter thereafter passes a predetermined angular orientation, and thereafter determining when the count corresponds to the specified sector to be accessed.

According to another form of the present invention, an apparatus includes a zone-bit-recording disk drive having a rotating platter and a head movable relative to a surface of the platter which is divided into at least two zones each having a respective different number of angularly spaced sectors therein, a first arrangement for maintaining a count of the number of sectors which pass the head after the platter passes a predetermined angular orientation, a second arrangement responsive to the count of the first arrangement for determining when the count corresponds to a specified sector to be accessed, and a third arrangement for disabling the second arrangement during an interval when the head moves out of a first of the zones toward a second of the zones which contains the specified sector and until the head has entered the second zone and the platter has thereafter passed a predetermined angular orientation.

BRIEF DESCRIPTION OF THE DRAWINGS

A preferred embodiment of the present invention is described in detail hereinafter with reference to the accompanying drawings, in which.

DETAILED DESCRIPTION

Figure 1:
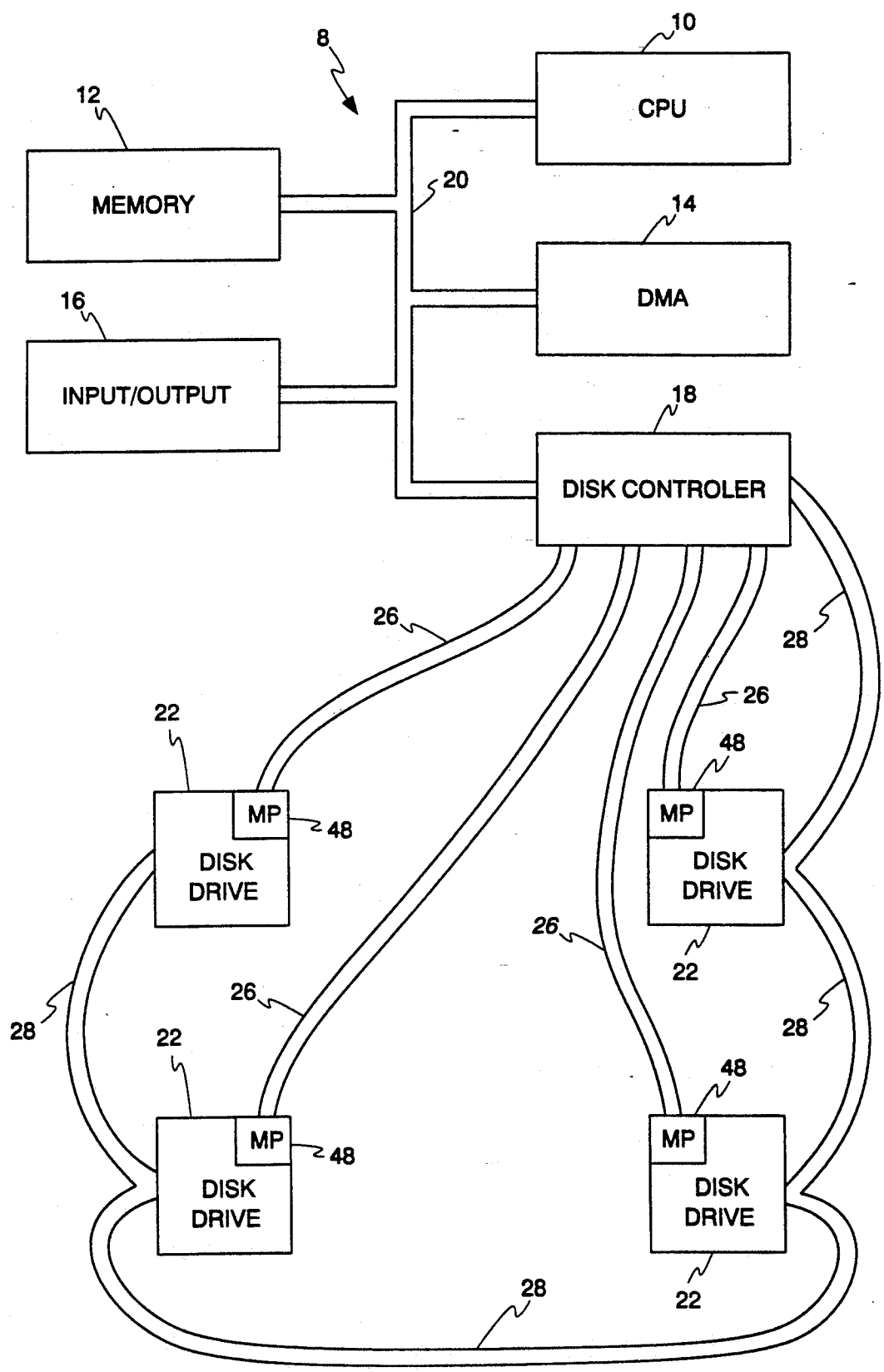
FIG. 1 is a block diagram of a computer system which embodies the present invention.

As illustrated in FIG. 1, a computer system 8 which embodies the invention includes a Central Processing Unit (CPU) 10, a memory unit 12, a Direct Memory Access (DMA) unit 14, several Input/Output (I/O) devices grouped at 16, a disk controller 18, a bus interface 20, and several disk drives 22. Each disk drive 22 has an internal disk drive microprocessor 48.

The disk controller 18 communicates with the disk drives 22 using a conventional, industry standard interface commonly known as the Enhanced Small Disk Interface (ESDI). This interface includes two types of cables. The first is a respective data cable 26 for each disk drive which is dedicated to the drive, which always carries sector and index pulses produced by the drive regardless of whether the disk drive is presently selected, which carries a command complete line from the drive indicating that the head is properly positioned and data can be read, and which also carries several other signals which are not important here. The second cable is a single control signal cable 28 for all the drives, which is daisy chained from disk drive to disk drive and which carries select signals indicating which drive is presently selected by the controller 18, signals which specify a sector which is to be located, and also other signals which are not important for purposes of the present invention. The select lines are used to specify and establish communication with one drive at any one time.

The CPU 10, through the bus 20, requests the controller 18 to access one or more specified sectors on one or more drives 22. The disk controller 18 then activates the appropriate disk drive(s). As each specified sector is located, regardless of the order in which they were requested, the disk controller 18 facilitates the transfer of data from the specified sector directly to memory 12, or to memory 12 via DMA 14.

Figure 2:
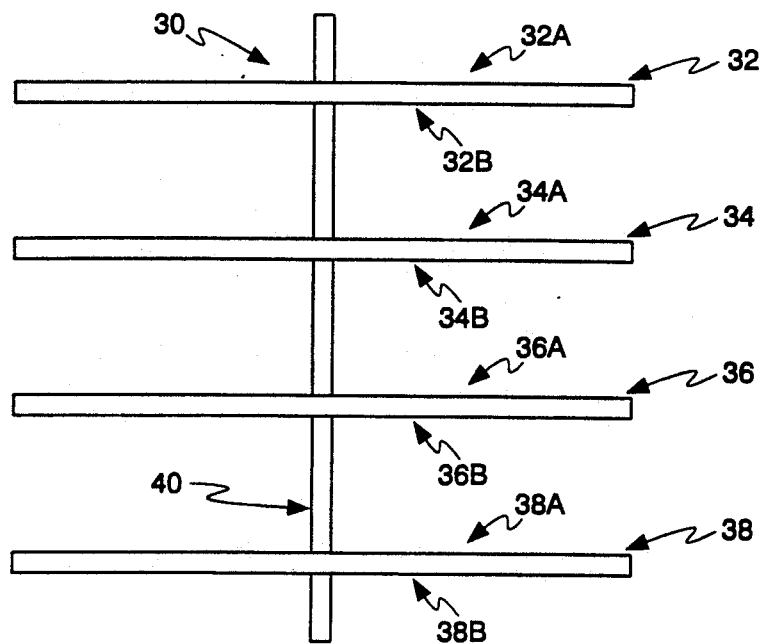
FIG. 2 is a fragmentary diagrammatic side view of a hard disk from a disk drive which is a component of the system of FIG. 1.

A disk assembly 30 from one of the disk drives 22 is shown in FIG. 2. It has a plurality of parallel, vertically spaced platters 32, 34, 36 and 38. Each platter has two recording surfaces 32A and 32B, 34A and 34B, 36A and 36B, and 38A and 38B, respectively. Digital information is stored on each surface of each platter using a respective conventional and not-illustrated read/write head.

Figure 3:
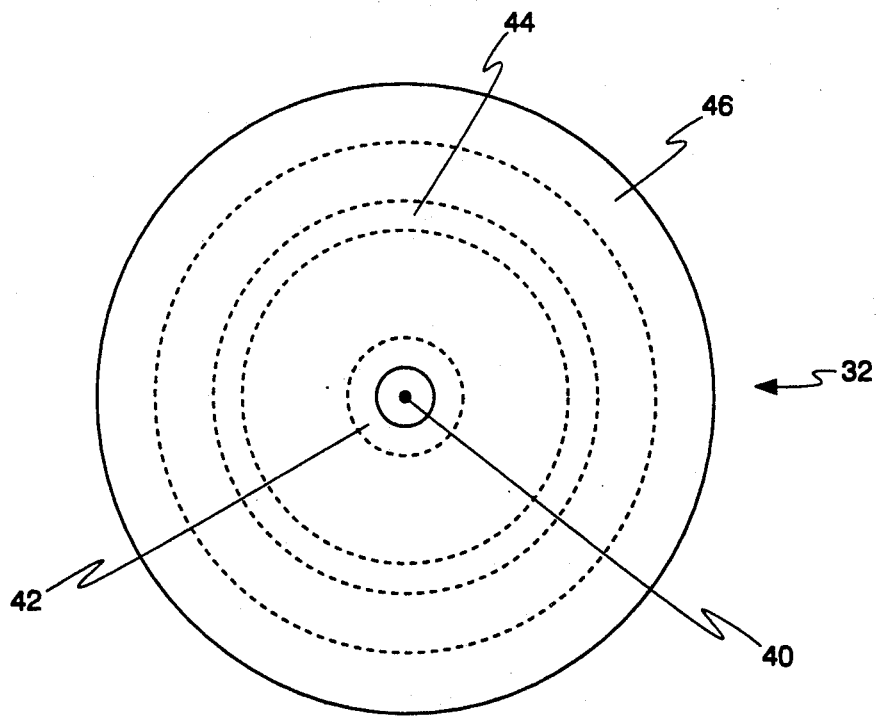
FIG. 3 is a diagrammatic top view of the hard disk of FIG. 2, showing several recording zones.

The disk assembly is formatted as follows. Each circular platter has a plurality of concentric tracks. Since the platters are vertically stacked along a common shaft 40, tracks of equal diameter on the respective platters together form a "cylinder" concentric with respect to shaft 40. Since each platter has a plurality of concentric tracks, there are a plurality of concentric cylinders. The cylinders are numbered consecutively from the outermost cylinder to the innermost cylinder. Each platter is also divided into a number of concentric zones which each include one or more tracks. Each track of each platter is divided into a predetermined number of sectors. The total number of sectors in each track depends on the zone in which that track is located, each of the tracks in any given zone having the same number of sectors. The division of each platter into zones utilizes the available space more efficiently and maintains a uniform bit density across the platter. For example, a typical zone-bit-recording (ZBR) disk assembly has platters which are divided into four to thirty zones. Each zone typically contains ten to five hundred tracks. The number of tracks per zone progressively decreases from the outermost zone to the innermost zone. The number of sectors per track typically ranges from thirty to sixty. Because of the larger circumference of the outer tracks, the outer tracks contain more sectors per track than the inner tracks. A ZBR platter from one of the disk drives 22 is shown in FIG. 3, and includes an innermost zone 42, a middle zone 44, and an outermost zone 46.

Bottom surface 38B (FIG. 2) is a servo track surface. It includes servo tracks and associated index and sector marks. Each index mark corresponds to an angular initialization point for a respective track on each of the other surfaces in the corresponding cylinder. A sector mark immediately following the index mark designates sector No. 1 of that track, the next sector mark designates sector No. 2, and so forth around the platter with increasing sector numbers up to the index mark. A specified sector is located by positioning the head for the corresponding surface above the track containing that sector and then counting the sector pulses following an index pulse until the specified sector is reached. The disk controller 18, after receiving the index pulse generated by the servo track, counts sector pulses generated by the servo track associated with respective sectors, the sector and index pulse information being supplied via data cable 26 to disk controller 18.

Figure 4:
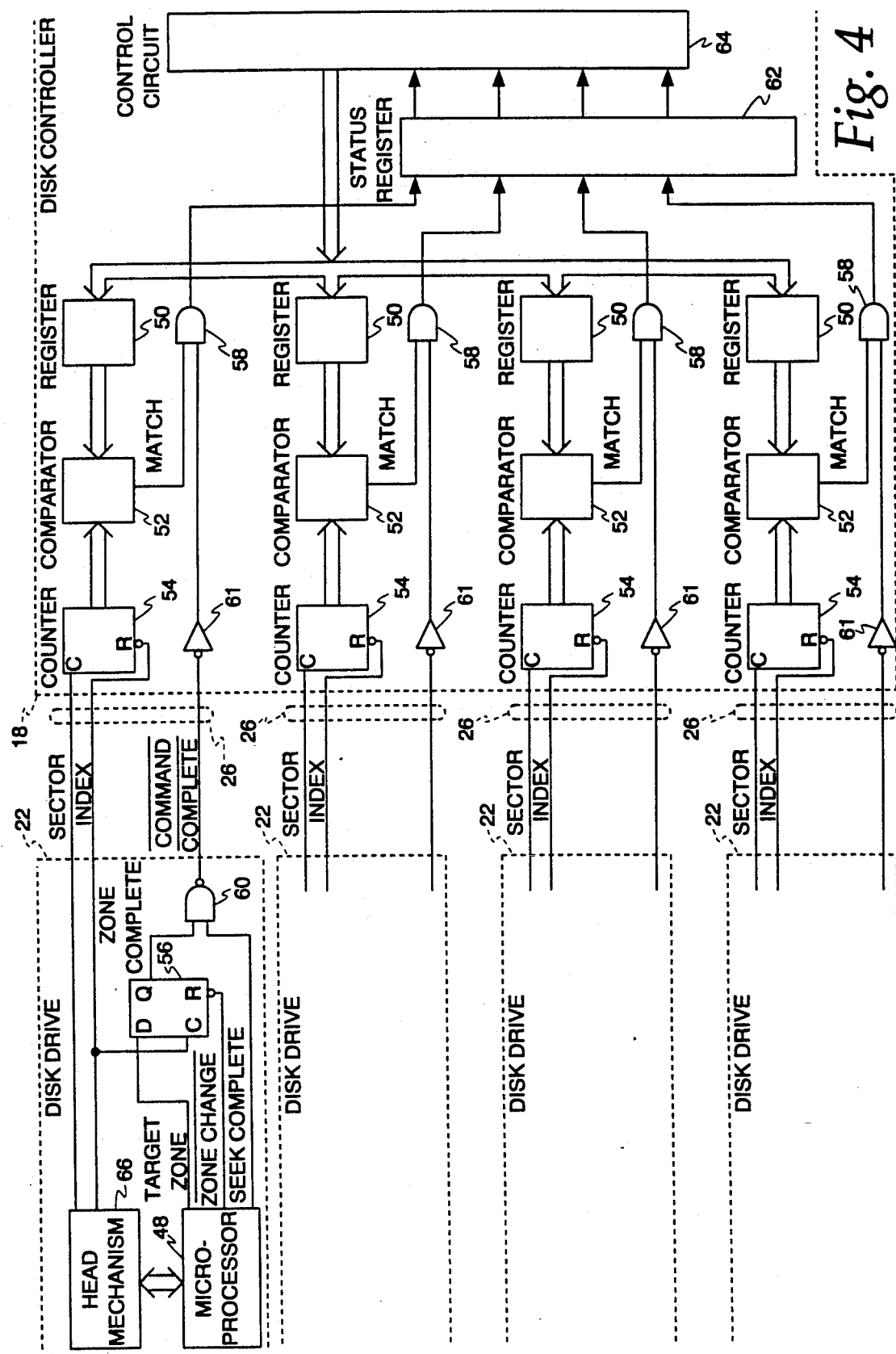
FIG. 4 is a schematic diagram of a position sensing circuit used in the system of FIG. 1.

The disk controller 18 for the disk assembly 30 is illustrated diagrammatically in FIG. 4. FIG. 4 shows only those portions of the controller 18, disk drives 22 and cables 26 which are pertinent to an understanding of the present invention. The disk drives 22 are treated as being identical for purposes of explaining the present invention, and thus the pertinent internal circuitry thereof is shown for only one of them in FIG. 4. The disk controller 18 includes four target registers 50, four comparators 52, four counters 54, four AND gates 58, four inverters 61, a status register 62 and a control circuit 64 which preferably includes a microprocessor.

The disk controller 18 supports four disk drives 22, which are also shown in FIG. 4. The index and sector pulses generated by each drive are supplied across its cable 26 to a respective counter 54 in the disk controller 18. The counter 54 is incremented by each sector pulse received, and is reset by each index pulse received. The disk controller 18 loads the target register 50 for a given disk drive with a numerical value, which is one less than the number of a specified sector on the drive, or in other words is the specified sector number decremented by one. Thus, the system will actually locate a sector which immediately precedes the specified sector, leaving the time during which that preceding sector moves past the head for the controller 18 to prepare to actually read the data from the specified sector as it reaches and moves past the head. The associated comparator 52 compares the value in the respective counter 54 and associated target register 50, and produces a match signal MATCH when they are in agreement.

As shown in FIG. 4, each disk drive 22 has a head mechanism 66 which includes several heads, a mechanism to move the heads, and associated control circuitry. Each head mechanism 66 produces the sector and index pulses and is controlled by the microprocessor 48 of the disk drive. When the disk controller 18 selects one of the disk drives 22, it instructs the drive 22 in a conventional and not-illustrated manner to access a specified sector. Thereafter, in accord with the present invention, the microprocessor 48 determines whether the specified sector is in the current zone, namely the zone with which the heads are currently radially aligned. Assuming that it is not and that the heads must be moved from the current zone to a target zone containing the sector, the microprocessor 48 lowers its TARGET ZONE output signal, and briefly lowers its active low ZONE CHANGE signal in order to reset the flipflop 56, so that the flipflop 56 in turn disables the gate 60. The microprocessor 48 also sets the signal SEEK COMPLETE to a logic low value. The microprocessor 48 then causes the head mechanism 66 to effect radial movement of the heads in a direction toward the target zone. When the target zone is reached, the TARGET ZONE signal is raised, so that on the leading edge of the next index pulse the flipflop 56 is set, and then its output ZONE COMPLETE changes to a logic high level and enables one input of the NAND gate 60. When the head reaches the track within that zone which contains the specified sector, the microprocessor 48 and head mechanism 66 halt movement of the head, and the microprocessor 48 changes the SEEK COMPLETE signal from a logic low to a logic high level, so that the output of the NAND gate 60 changes from a logic high to a logic low voltage to indicate to the disk controller 18 that the head is now radially aligned with the track containing the sector. This signal passes across the active low COMMAND COMPLETE line in the cable 26, and in the disk controller 18 it is inverted by inverter 61 and then enables one input of the AND gate 58. It should be noted that the counter 54 is cleared by the same index pulse which sets the associated flipflop 56, thereby ensuring that the counter 54 is being incremented by sector pulses from a servo track associated with the target zone. As the disk continues to rotate and counter 54 is incremented by successive sector pulses, the counter 54 will eventually contain the same value as the associated register 50, so that the comparator produces the match signal MATCH to enable the other input of the AND gate 58. The output of each of the AND gates 58 is supplied to a status register 62, which is monitored by the control circuit 64, and thus the control circuit 64 will receive prompt notification when any one of the disk drives 22 locates a specified sector. The control circuit 64 can then prepare to write data to or read data from the specified sector as the specified sector reaches and moves past the head of the drive.

Because of the inequality of the number of sectors in each zone in a zone-bit-recording system, the output of comparator 52 must be disabled when the head crosses out of one zone and into another, because the value in counter 54 is no longer valid (since the number of sectors per track has changed), and because the match signal MATCH from the comparator 52 could be erroneous. As shown in FIG. 4, this disable is performed when the match output signal MATCH from the comparator 52 is ANDed in gate 58 with the COMMAND COMPLETE signal from the disk drive. The COMMAND COMPLETE signal is valid only when the SEEK COMPLETE and ZONE COMPLETE signals are both provided to the AND gate 60.

Figure 5:
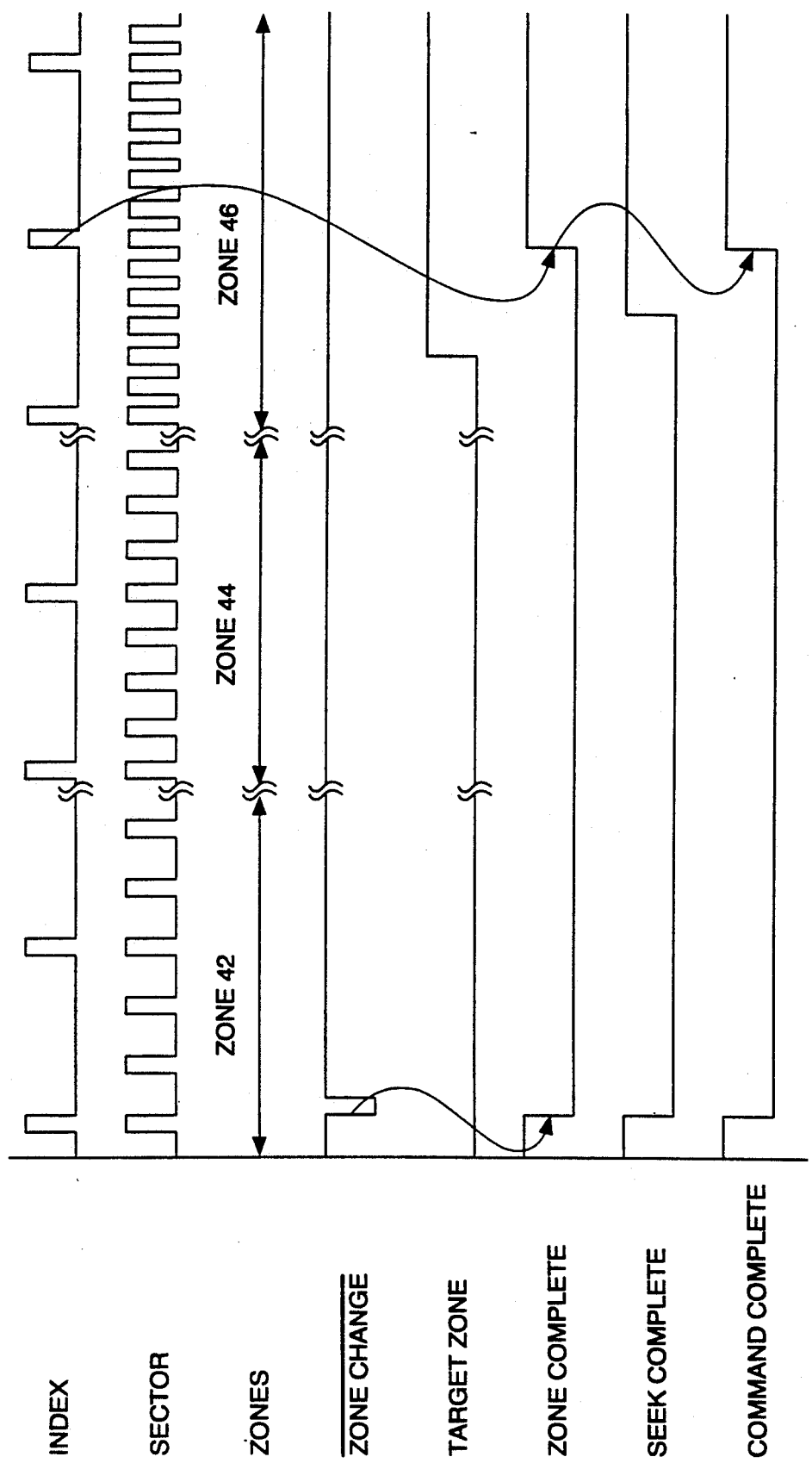
FIG. 5 is a timing diagram showing the timing relationship between selected signals from FIG. 4.

FIG. 5 is a timing diagram showing how the circuit of FIG. 4 operates. The disk controller 18 periodically polls the status register 62 at a rate several orders of magnitude faster than the sixteen and six tenth (16.6) milliseconds it takes a disk in a disk drive 22 to make a revolution. Statistical probability dictates that the disk controller 18 will typically be available and scanning at the instant the sector immediately preceding the specified sector is located.

Although a preferred embodiment of the invention has been shown and described in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An apparatus comprising: a zone-bit-recording disk drive having a rotating platter and having a head movable relative to a surface of said platter which is divided into two zones each having a respective different number of angularly spaced sectors therein; first means for maintaining a count of the number of sectors which pass said head after said platter passes a predetermined angular orientation; second means responsive to said count of said first means for determining when said count corresponds to a specified sector to be accessed by said head; and third means for disabling said second means during an interval when said head moves out of a first of said zones toward a second of said zones which contains said specified sector and until said head has entered said second zone and said platter has thereafter passed a predetermined angular orientation; wherein said disk drive includes means for generating a sector pulse each time one of said sectors on said rotating platter moves past said head and for generating an index pulse each time said platter is in one of said predetermined angular positions; and wherein said third means includes means for determining whether the specified sector to be accessed is in the zone in which said head is currently positioned and for generating a zone change signal when said specified sector and said head are in different zones, and for generating a target zone signal after said head reaches said zone containing said specified sector, said third means disabling said second means during an interval from said zone change signal until one of said index pulses occurs after said target zone signal.

2. An apparatus according to claim 1, wherein said surface of said platter includes a plurality of concentric tracks, each said zone having therein at least one of said tracks, and wherein said disk drive includes means for generating a seek complete signal when said head is in radial alignment with one of said tracks containing said specified sector, said third means effecting said disabling of said second means until after said seek complete signal.

3. An apparatus comprising: a zone-bit-recording disk drive having a rotating platter and having a head movable relative to a surface of said platter which is divided into two zones each having a respective different number of angularly spaced sectors therein; first means for maintaining a count of the number of sectors which pass said head after said platter passes a predetermined angular orientation; second means responsive to said count of said first means for determining when said count corresponds to a specified sector to be accessed by said head; and third means for disabling said second means during an interval when said head moves out of a first of said zones toward a second of said zones which contains said specified sector and until said head has entered said second zone and said platter has thereafter passed a predetermined angular orientation; wherein said disk drive includes means for generating a sector pulse each time one of said sectors on said rotating platter moves past said head and for generating an index pulse each time said platter is in one of said predetermined angular positions; wherein said third means includes means for determining whether the specified sector to be accessed is in the zone in which said head is currently positioned and for generating a zone change signal when said specified sector and said head are in different zones, and for generating a target zone signal after said head reaches said zone containing said specified sector, said third means disabling said second means during an interval from said zone change signal until one of said index pulses occurs after said target zone signal; wherein said surface of said platter includes a plurality of concentric tracks, each said zone having therein at least one of said tracks; wherein said disk drive includes means for generating a seek complete signal when said head is in radial alignment with one of said tracks containing said specified sector, said third means effecting said disabling of said second means until after said seek complete signal; and wherein said third means includes a D-type flipflop having a data input, a clock input, a reset input, and a data output, said target zone signal being applied to said data input of said flipflop, said index pulses being applied to said clock input of said flipflop, and said zone change signal being applied to said reset input of said flipflop, and includes a NAND gate, said data output of said flipflop being applied to one input of said NAND gate and said seek complete signal being applied to a further input of said NAND gate, said NAND gate having an output which can assume two logical states and said second means being respectively enabled and disabled when said output of said NAND gate is respectively in said two logical states.

4. An apparatus according to claim 3, wherein said third means further includes an inverter having an input coupled to said output of said NAND gate, and includes an AND gate having a first input coupled to said output of said inverter and a second input coupled to an output of said second means.

5. An apparatus according to claim 4, wherein said second means includes a counter having a clock input to which are applied said sector pulses and having a reset input to which are applied said index pulses, and includes a comparator which compares a value in said counter to a reference number representing said specified sector, said comparator having an output which is said output of said second means coupled to said second input of said AND gate.

6. An apparatus according to claim 3, including means coupled to and rotating with said platter and defining a further surface having thereon a plurality of concentric servo tracks, and including a further head adjacent said further surface which is moved radially in synchronism with said first-mentioned head, said servo tracks each having stored therein an index mark and a plurality of angularly spaced servo marks, said further head producing one of said index pulses each time it is passed by one of said index marks and producing one of said sector pulses each time it is passed by one of said servo marks.

* * * * *